(12) United States Patent
Qiang et al.

(10) Patent No.: US 12,297,215 B2
(45) Date of Patent: May 13, 2025

(54) METHODS FOR PREPARING A BORON DIPYRROMETHENE (BODIPY) DERIVATIVE AND APPLICATIONS THEREOF

(71) Applicant: SHAANXI UNIVERSITY OF SCIENCE & TECHNOLOGY, Shaanxi (CN)

(72) Inventors: Taotao Qiang, Xi'an (CN); Fei Cheng, Xi'an (CN)

(73) Assignee: SHAANXI UNIVERSITY OF SCIENCE & TECHNOLOGY, Xi'an (CN)

( * ) Notice: Subject to any disclaimer, the term of this patent is extended or adjusted under 35 U.S.C. 154(b) by 151 days.

(21) Appl. No.: 18/054,921

(22) Filed: Nov. 14, 2022

(65) Prior Publication Data
US 2023/0287013 A1     Sep. 14, 2023

(30) Foreign Application Priority Data

Mar. 12, 2022   (CN) .......................... 202210252654.8

(51) Int. Cl.
*C07F 5/02*     (2006.01)
*B01J 35/39*    (2024.01)

(52) U.S. Cl.
CPC ............... *C07F 5/027* (2013.01); *B01J 35/39* (2024.01)

(58) Field of Classification Search
CPC .................................. C07F 5/027; B01J 35/39
See application file for complete search history.

(56) References Cited

U.S. PATENT DOCUMENTS

2012/0070382 A1   3/2012   Liu
2016/0252488 A1   9/2016   Das et al.

FOREIGN PATENT DOCUMENTS

| CN | 106349261 A | 1/2017 |
| CN | 108892683 A | 11/2018 |
| CN | 113289687 A | 8/2021 |

OTHER PUBLICATIONS

Sekhar, A mobius-expanded porphyrinoid with 2,3-pyrrollic connection from a planar pi-extended BODIPY, 2020, vol. 24, p. 379-385. (Year: 2020).*
First Office Action in Chinese Application No. 202210252654.8 mailed on Oct. 12, 2023, 13 pages.
Notification to Grant Patent Right for Invention in Chinese Application No. 202210252654.8 mailed on Nov. 28, 2023, 2 pages.

* cited by examiner

*Primary Examiner* — Kamal A Saeed
*Assistant Examiner* — Karen Cheng
(74) *Attorney, Agent, or Firm* — METIS IP LLC

(57) ABSTRACT

The embodiment of the present disclosure provides a method for preparing a boron dipyrromethene (BODIPY) derivative and an application of the BODIPY derivative. The method comprises: 1) taking BODIPY-1, diphenylacetylene, copper acetate monohydrate, anhydrous sodium carbonate, and metal catalyst, and dispersing the BODIPY-1, the diphenylacetylene, the copper acetate monohydrate, the anhydrous sodium carbonate, and the metal catalyst in an organic solvent for carrying out a cyclization reaction to obtain a cyclization product mixture; 2) rotary evaporating the cyclization product mixture to obtain a concentrated solution of a reaction system; 3) purifying the concentrated solution of the reaction system by a column chromatography, continuing to rotary evaporate a purified product, and then drying a product after the rotary evaporating to obtain a photocatalytic material BODIPY-2.

4 Claims, 8 Drawing Sheets

METHODS FOR PREPARING A BORON DIPYRROMETHENE (BODIPY) DERIVATIVE AND APPLICATIONS THEREOF

CROSS-REFERENCE TO RELATED APPLICATION

This application claims priority of Chinese Patent Application No. 202210252654.8, filed on Mar. 12, 2022, the contents of which are entirely incorporated herein by reference.

TECHNICAL FIELD

The present disclosure relates to the technical field of photocatalysis, and in particular to a method for preparing a boron dipyrromethene (BODIPY) derivative and an application.

BACKGROUND

The rapid development of industrial economy has led to increasingly serious environmental pollution, especially, the pollution of heavy metal ions hexavalent chromium Cr(VI) in industrial wastewater widely exists in industrial production processes such as electroplating, printing and dyeing, and tanning. The Cr(VI) is carcinogenic and mutagenic, and emission of the Cr(VI) into the environment may cause great damage to human health and ecological balance. Therefore, how to remove or reduce hexavalent chromium in wastewater with high efficiency and low cost is one of the hot topics studied by scientists.

At present, the treatment technology for Cr(VI) includes biological flocculation method, ion exchange method, chemical precipitation adsorption method, etc., which has defects such as high energy consumption and serious secondary pollution. Photocatalytic technology can utilize the reducing power of photogenerated electrons to reduce highly toxic hexavalent chromium Cr(VI) to low toxicity trivalent chromium Cr(III), which has low energy consumption and no secondary pollution and is considered to be one of the most promising processing technologies.

The boron dipyrromethene (BODIPY) is an organic small molecule photosensitizer composed of four elements of C, H, F and B. The modifiability, stability and good photophysical properties of the molecular structure make its monomers and various derivatives have a wide range of potential applications in the field of photocatalysis, and the BODIPY gradually becomes the research focus of researchers. In the field of photocatalysis, the currently reported photocatalytic materials are usually organic and inorganic composite materials and macromolecular materials such as MOFs. There are a series of problems such as difficult construction, difficult structural characterization, poor stability, and low utilization of visible light, which greatly limit its further application, and the application of organic small molecule photosensitizers to photocatalytic reduction of hexavalent chromium has never been reported. Therefore, the preparation of BODIPY derivative and its application in the field of photocatalysis still need to be further studied.

SUMMARY

Some embodiments of the present disclosure provide a method for preparing a boron dipyrromethene (BODIPY) derivative and an application to solve the problems of difficult construction, difficult structural characterization, poor stability, and low utilization of visible light in the photocatalytic materials of the prior art.

For achieving the above object, one or more embodiments of the present disclosure provide a method for preparing BODIPY derivative, and the method may comprise the following operations.

1) Taking BODIPY-1, diphenylacetylene, copper acetate monohydrate, anhydrous sodium carbonate, and metal catalyst, and dispersing the BODIPY-1, the diphenylacetylene, the copper acetate monohydrate, the anhydrous sodium carbonate, and the metal catalyst in an organic solvent for carrying out a cyclization reaction to obtain a cyclization product mixture.
2) Rotary evaporating the cyclization product mixture to obtain a concentrated solution of a reaction system.
3) Purifying the concentrated solution of the reaction system by a column chromatography, continuing to rotary evaporate a purified product, and then drying a product after the rotary evaporating to obtain a photocatalytic material BODIPY-2, and the photocatalytic material BODIPY-2 being BODIPY derivative.

The structural formulas of the BODIPY-1 and the BODIPY-2 are as follows:

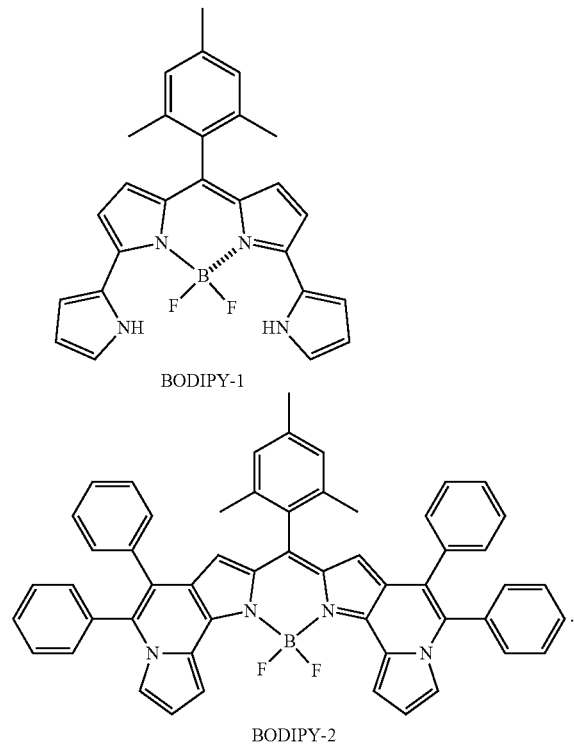

BODIPY-1

BODIPY-2

In some embodiments, in operation 1), a molar ratio of the BODIPY-1 to the diphenylacetylene may be 1.0:(2.3~3.0), a molar ratio of the BODIPY-1 to the copper acetate monohydrate may be 1.0:(2.0~3.0), and a molar ratio of the BODIPY-1 to the anhydrous sodium carbonate may be 1.0:(2.0~3.0). In some embodiments, in operation 1), a molar ratio of the BODIPY-1 to the diphenylacetylene may be 1.0:(3.3~4.0), a molar ratio of the BODIPY-1 to the copper acetate monohydrate may be 1.0:(3.1~3.9), and a molar ratio of the BODIPY-1 to the anhydrous sodium carbonate may be 1.0:(3.1~3.9). In some embodiments, in operation 1), a molar ratio of the BODIPY-1 to the diphenylacetylene may be 1.0:(2.4~2.9), a molar ratio of the BODIPY-1 to the copper acetate monohydrate may be 1.0:(2.1~2.9), and a molar ratio of the BODIPY-1 to the anhydrous sodium carbonate may be 1.0:(2.1~2.9). In some embodiments, in operation 1), a molar ratio of the BODIPY-1 to the diphenylacetylene may be 1.0:(2.5~2.8), a molar ratio of the BODIPY-1 to the copper acetate monohydrate may be 1.0:(2.2~2.8), and a molar ratio of the BODIPY-1 to the anhydrous sodium carbonate may be 1.0:(2.2~2.8). In some embodiments, in operation 1), a molar ratio of the BODIPY-1 to the diphenylacetylene may be 1.0:(2.6~2.7), a molar ratio of the BODIPY-1 to the copper acetate monohydrate may be 1.0:(2.4~2.6), and a molar ratio of the BODIPY-1 to the anhydrous sodium carbonate may be 1.0:(2.4~2.6). In some embodiments, in operation 1), a molar ratio of the BODIPY-1 to the diphenylacetylene may be 1.0:2.5, a molar ratio of the BODIPY-1 to the copper acetate monohydrate may be 1.0:2.5, and a molar ratio of the BODIPY-1 to the anhydrous sodium carbonate may be 1.0:2.5.

In some embodiments, in operation 1), the organic solvent may be 1,2-dichloroethane, and a molar ratio of the BODIPY-1 and the 1,2-dichloroethane may be 1.0:(250~500). In some embodiments, a molar ratio of the BODIPY-1 and the 1,2-dichloroethane may be 1.0:(200~500). In some embodiments, a molar ratio of the BODIPY-1 and the 1,2-dichloroethane may be 1.0:(300~450). In some embodiments, a molar ratio of the BODIPY-1 and the 1,2-dichloroethane may be 1.0:(300~400). In some embodiments, a molar ratio of the BODIPY-1 and the 1,2-dichloroethane may be 1.0:(400~450).

In some embodiments, in operation 1), the metal catalyst may be bis[(pentamethylcyclopentadienyl)dichloro-rhodium], and a molar ratio of the BODIPY-1 to the bis[(pentamethylcyclopentadienyl)dichloro-rhodium] may be 1.0:(0.05~0.1). In some embodiments, the metal catalyst may be bis[(pentamethylcyclopentadienyl)dichloro-rhodium], and a molar ratio of the BODIPY-1 to the bis[(pentamethylcyclopentadienyl)dichloro-rhodium] may be 1.0:(0.10~0.15). In some embodiments, the metal catalyst may be bis[(pentamethylcyclopentadienyl)dichloro-rhodium], and a molar ratio of the BODIPY-1 to the bis[(pentamethylcyclopentadienyl)dichloro-rhodium] may be 1.0:(0.06~0.09). In some embodiments, the metal catalyst may be bis[(pentamethylcyclopentadienyl)dichloro-rhodium], and a molar ratio of the BODIPY-1 to the bis[(pentamethylcyclopentadienyl)dichloro-rhodium] may be 1.0:(0.07~0.08).

In some embodiments, in operation 1), the cyclization reaction may be carried out in an oil bath, a temperature of the cyclization reaction may be in a range of 65° C.~75° C., and a time of the cyclization reaction may be in a range of 8 hours~15 hours. In some embodiments, a temperature of the cyclization reaction may be in a range of 60° C.~80° C., and a time of the cyclization reaction may be in a range of 6 hours~18 hours. In some embodiments, a temperature of the cyclization reaction may be in a range of 66° C.~74° C., and a time of the cyclization reaction may be in a range of 9 hours~14 hours. In some embodiments, a temperature of the cyclization reaction may be in a range of 67° C.~73° C., and a time of the cyclization reaction may be in a range of 10 hours~13 hours. In some embodiments, a temperature of the cyclization reaction may be in a range of 68° C.~72° C., and a time of the cyclization reaction may be in a range of 11 hours~12 hours. In some embodiments, a temperature of the cyclization reaction may be in a range of 69° C.~71° C., and a time of the cyclization reaction may be 11.5 hours. In some embodiments, a temperature of the cyclization reaction may be 70° C., and a time of the cyclization reaction may be 11.5 hours.

In some embodiments, in operation 3), a mobile phase of the column chromatography for purification may be formed by mixing dichloromethane and petroleum ether with a volume ratio of 1:(0.8~1.2). In some embodiments, a mobile phase of the column chromatography for purification may be formed by mixing dichloromethane and petroleum ether with a volume ratio of (2~5):1. In some embodiments, a mobile phase of the column chromatography for purification may be formed by mixing dichloromethane and petroleum ether with a volume ratio of 1:(2~5). In some embodiments, a mobile phase of the column chromatography for purification may be formed by mixing dichloromethane and petroleum ether with a volume ratio of 1:(0.9~1.1). In some embodiments, a mobile phase of the column chromatography for purification may be formed by mixing dichloromethane and petroleum ether with a volume ratio of 1:1.

According to another aspect of some embodiments of the present disclosure, the present disclosure also provides an application for reducing hexavalent chromium based on BODIPY-2 photocatalysis, a photocatalyst is added to a solution including the hexavalent chromium for firstly performing a dark reaction, and then the photocatalysis is realized under a condition of light source illumination to reduce the hexavalent chromium, the photocatalyst is the BODIPY-2 prepared by the method for preparing the BODIPY derivative described in any one of the above.

In some embodiments, the solution including the hexavalent chromium may be an aqueous solution of potassium dichromate. In some embodiments, the solution including the hexavalent chromium may also be an aqueous solution including other types of hexavalent chromium compounds.

In some embodiments, a potential of hydrogen (pH) value of the solution including the hexavalent chromium may be within a range of 2~8. In some embodiments, a pH value of the solution including the hexavalent chromium may be within a range of 3~7. In some embodiments, a pH value of the solution including the hexavalent chromium may be within a range of 4~6.

In some embodiments, the light source may be visible light or sunlight.

The method for preparing a BODIPY derivative and the application of one or more embodiments of the present disclosure may reach the following beneficial effect by adopting above-mentioned technical scheme.

1) The method for preparing a BODIPY derivative according to one or more embodiments of the present disclosure has advantages of readily available raw material, short synthesis route, a mild condition, structure easy to characterize, simple operate, high yield, and the stable structure of obtained product.

2) In the application of the photocatalytic reduction of hexavalent chromium according to one or more embodiments of the present disclosure, the BODIPY-2, as a photocatalyst, has low dosage, high reduction efficiency, strong acid and alkali resistance, and can directly use sunlight for photocatalytic reduction, that is, the BODIPY-2 can be applied to solar photocatalytic reduction of hexavalent chromium in industrial wastewater, which is convenient for wide popularization and use.

3) One or more embodiments of the present disclosure utilize the BODIPY-2 as photocatalyst to reduce hexavalent chromium, the BODIPY-2 is non-toxic and pollution-free and BODIPY-2 is applied to wastewater treatment, which can efficiently reduce toxic hexavalent chromium ions in industrial wastewater. In addition, the BODIPY-2 has good optical stability and acid and alkali resistance, reduces the harm of harmful metals to human health and ecological environment, and turns waste into treasure and reduces environmental pollution.

BRIEF DESCRIPTION OF THE DRAWINGS

Below in conjunction with the accompanying drawings and specific embodiments, some embodiments of the present disclosure are described in further detail.

The object realization, functional features and advantages of the present disclosure will be further described with reference to the accompanying drawings in conjunction with the embodiments.

DETAILED DESCRIPTION

One or more embodiments of the present disclosure may be further described below in conjunction with the accompanying drawings and the specific implementation. Terms such as "up", "down", "left", "right", "middle" and "one" quoted in the preferred embodiment are only for the convenience of description and clarity, but not for limiting the implementable scope of some embodiments of the present disclosure. Changes or adjustments to their relative relationships, without substantial changes to the technical content, shall also be regarded as the scope of the implementation of one or more embodiments of present disclosure.

Figure 1:
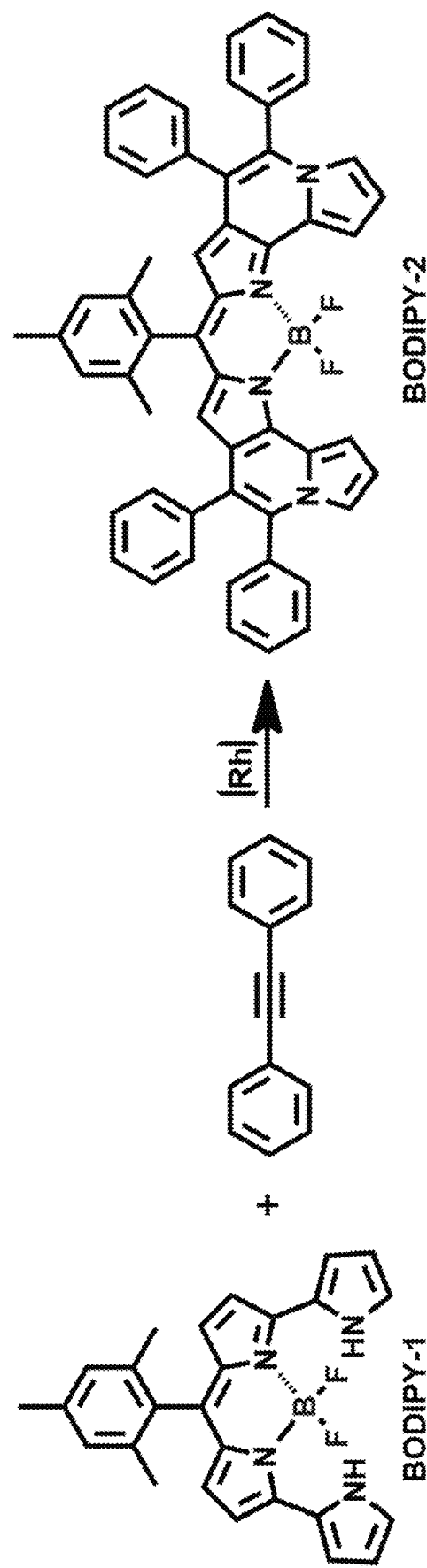
FIG. 1 is the chemical reaction formula for preparing BODIPY-2 according to some embodiments of the present disclosure.

One or more embodiments of the present disclosure provide a method for preparing a boron dipyrromethene (BODIPY) derivative. In the method, the BODIPY-1 and symmetrical alkynes (diphenylacetylene) are dispersed in organic solvent of 1,2-dichloroethane for carrying out a cyclization reaction under a constant temperature condition to obtain a cyclization product mixture using bis[(pentamethylcyclopentadienyl)dichloro-rhodium] as a catalyst, and then the BODIPY-2 is obtained by separating and purifying the cyclization product mixture. The chemical reaction formula is shown in FIG. 1, and BODIPY refers to boron dipyrromethene.

In order to allow those skilled in the art to further understand the technical solutions of some embodiments of the present disclosure, the technical solutions of one or more embodiments of the present disclosure are described in further detail below through specific embodiments.

Embodiment 1

In operation 1, adding BODIPY-1 (44 mg, 0.1 mmol), diphenylacetylene (53.5 mg, 0.3 mmol), bis[(pentamethylcyclopentadienyl)dichloro-rhodium] (6.18 mg, 0.01 mmol), copper acetate monohydrate (79.9 mg, 0.4 mmol), sodium carbonate (42.4 mg, 0.4 mmol) into a dry Schlenk reaction tube, then adding 1,2-dichloroethane (3 mL) into the reaction tube, placing the reaction tube in an oil bath at 65° C., and stirring at a constant speed for 8 h to obtain a cyclization product mixture.

In operation 2, rotary evaporating the cyclization product mixture to remove the solvents in the cyclization product mixture to obtain concentrated solution of a reaction system.

In operation 3, purifying the obtained concentrated solution of the reaction system by a column chromatography, the mobile phase of chromatographic column separation is the dichloromethane and petroleum ether with a volume ratio of 1:1, then rotary evaporating the purified product to remove the mobile phase solvent, and finally drying the product after the rotary evaporating to obtain a photocatalytic material BODIPY-2.

The productive rate of the prepared BODIPY-2 according to the present embodiment is measured as 71%.

Embodiment 2

In operation 1, adding BODIPY-1 (44 mg, 0.1 mmol), diphenylacetylene (53.5 mg, 0.3 mmol), bis[(pentamethylcyclopentadienyl)dichloro-rhodium] (6.18 mg, 0.01 mmol), copper acetate monohydrate (79.9 mg, 0.4 mmol), sodium carbonate (42.4 mg, 0.4 mmol) into a dry Schlenk reaction tube, then adding 1,2-dichloroethane (3 mL) into the reaction tube, placing the reaction tube in an oil bath at 70° C., and stirring at a constant speed for 8 h to obtain a cyclization product mixture.

In operation 2, rotary evaporating the cyclization product mixture to remove the solvents in the cyclization product mixture to obtain concentrated solution of a reaction system.

In operation 3, purifying the obtained concentrated solution of the reaction system by a column chromatography, the mobile phase of chromatographic column separation is the dichloromethane and petroleum ether with a volume ratio of 1:1, then rotary evaporating the purified product to remove the mobile phase solvent, and finally drying the product after the rotary evaporating to obtain a photocatalytic material BODIPY-2.

The productive rate of the prepared BODIPY-2 according to the present embodiment is measured as 74%.

Embodiment 3

In operation 1, adding BODIPY-1 (44 mg, 0.1 mmol), diphenylacetylene (53.5 mg, 0.3 mmol), bis[(pentamethylcyclopentadienyl)dichloro-rhodium] (6.18 mg, 0.01 mmol), copper acetate monohydrate (79.9 mg, 0.4 mmol), sodium carbonate (42.4 mg, 0.4 mmol) into a dry Schlenk reaction tube, then adding 1,2-dichloroethane (3 mL) into the reaction tube, placing the reaction tube in an oil bath at 75° C., and stirring at a constant speed for 8 h to obtain a cyclization product mixture.

In operation 2, rotary evaporating the cyclization product mixture to remove the solvents in the cyclization product mixture to obtain concentrated solution of a reaction system.

In operation 3, purifying the obtained concentrated solution of the reaction system by a column chromatography, the mobile phase of chromatographic column separation is the dichloromethane and petroleum ether with a volume ratio of 1:1, then rotary evaporating the purified product to remove the mobile phase solvent, and finally drying the product after the rotary evaporating to obtain a photocatalytic material BODIPY-2.

The productive rate of the prepared BODIPY-2 according to the present embodiment is measured as 72%.

Embodiment 4

In operation 1, adding BODIPY-1 (44 mg, 0.1 mmol), diphenylacetylene (53.5 mg, 0.3 mmol), bis[(pentamethylcyclopentadienyl)dichloro-rhodium] (6.18 mg, 0.01 mmol), copper acetate monohydrate (79.9 mg, 0.4 mmol), sodium carbonate (42.4 mg, 0.4 mmol) into a dry Schlenk reaction tube, then adding 1,2-dichloroethane (3 mL) into the reaction tube, placing the reaction tube in an oil bath at 70° C., and stirring at a constant speed for 12 h to obtain a cyclization product mixture.

In operation 2, rotary evaporating the cyclization product mixture to remove the solvents in the cyclization product mixture to obtain concentrated solution of a reaction system.

In operation 3, purifying the obtained concentrated solution of the reaction system by a column chromatography, the mobile phase of chromatographic column separation is the dichloromethane and petroleum ether with a volume ratio of 1:1, then rotary evaporating the purified product to remove the mobile phase solvent, and finally drying the product after the rotary evaporating to obtain a photocatalytic material BODIPY-2.

The productive rate of the prepared BODIPY-2 according to the present embodiment is measured as 75%.

Embodiment 5

In operation 1, adding BODIPY-1 (44 mg, 0.1 mmol), diphenylacetylene (53.5 mg, 0.3 mmol), bis[(pentamethylcyclopentadienyl)dichloro-rhodium] (6.18 mg, 0.01 mmol), copper acetate monohydrate (79.9 mg, 0.4 mmol), sodium carbonate (42.4 mg, 0.4 mmol) into a dry Schlenk reaction tube, then adding 1,2-dichloroethane (3 mL) into the reaction tube, placing the reaction tube in an oil bath at 70° C., and stirring at a constant speed for 15 h to obtain a cyclization product mixture.

In operation 2, rotary evaporating the cyclization product mixture to remove the solvents in the cyclization product mixture to obtain concentrated solution of a reaction system.

In operation 3, purifying the obtained concentrated solution of the reaction system by a column chromatography, the mobile phase of chromatographic column separation is the dichloromethane and petroleum ether with a volume ratio of 1:1, then rotary evaporating the purified product to remove the mobile phase solvent, and finally drying the product after the rotary evaporating to obtain a photocatalytic material BODIPY-2.

The productive rate of the prepared BODIPY-2 according to the present embodiment is measured as 75%.

As can be known from the analysis of the embodiments 1-5, under the condition of increasing reaction temperature and appropriately prolonging the reaction time, the productive rate of the BODIPY-2 may be improved, and the highest productive rate may reach 75%. It is known that the productive rate of the BODIPY-2 prepared by the synthetic method of the current prior art is up to 70%, however, the productive rate of the BODIPY-2 prepared by one or more embodiments of the present disclosure is 71-75%, which is significantly higher than the prior art. Moreover, the raw materials of one or more embodiments of the present disclosure are easily available, the synthesis route is short, and the conditions are mild, which is more widely used and applied. The material ratio and process parameters of the above-mentioned embodiment 5 is the best technical solution of one or more embodiments of the present disclosure.

Figure 2:
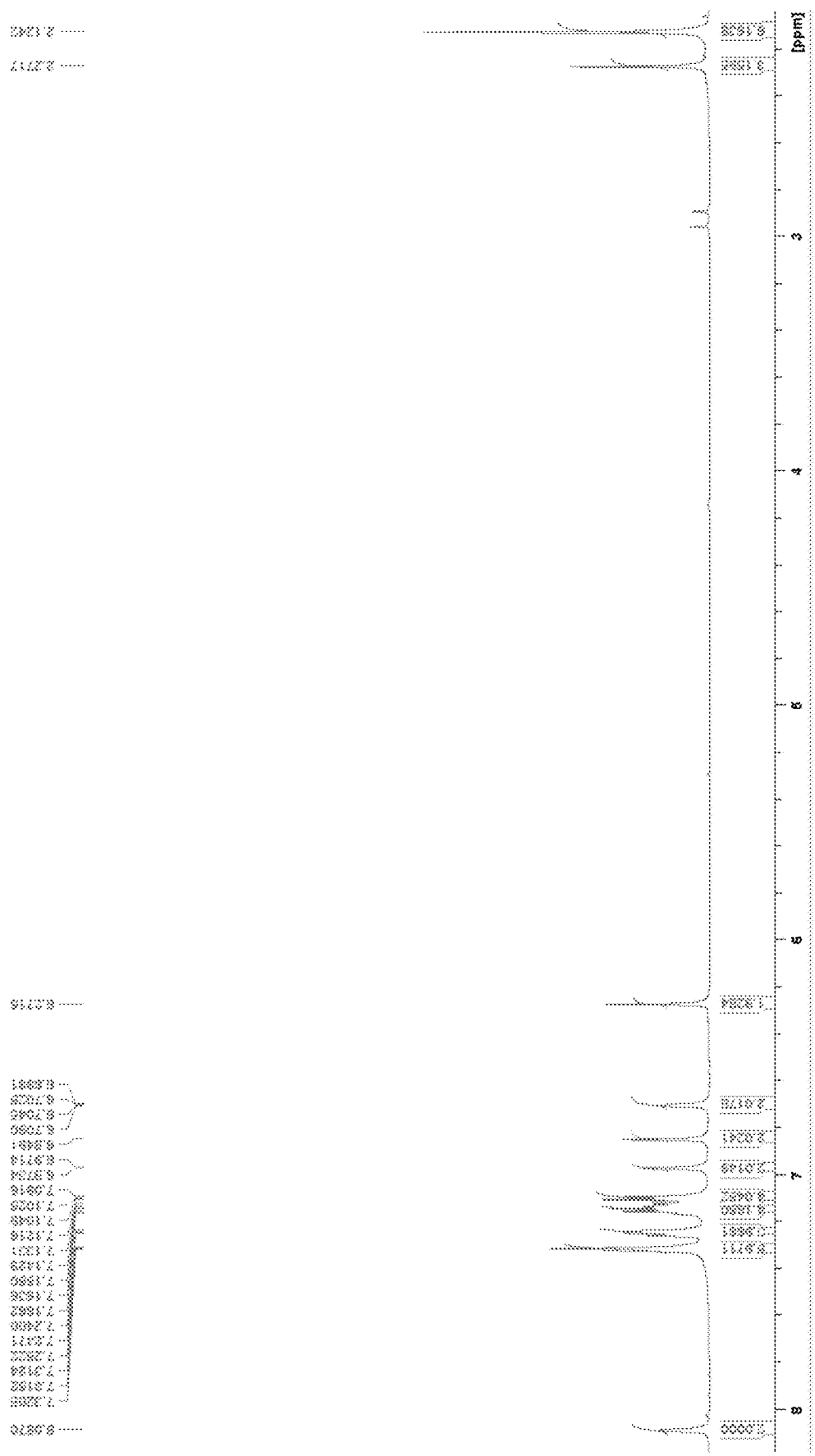
FIG. 2 is the $^1$H NMR spectrum of the prepared BODIPY-2 according to some embodiments of the present disclosure.
Figure 3:
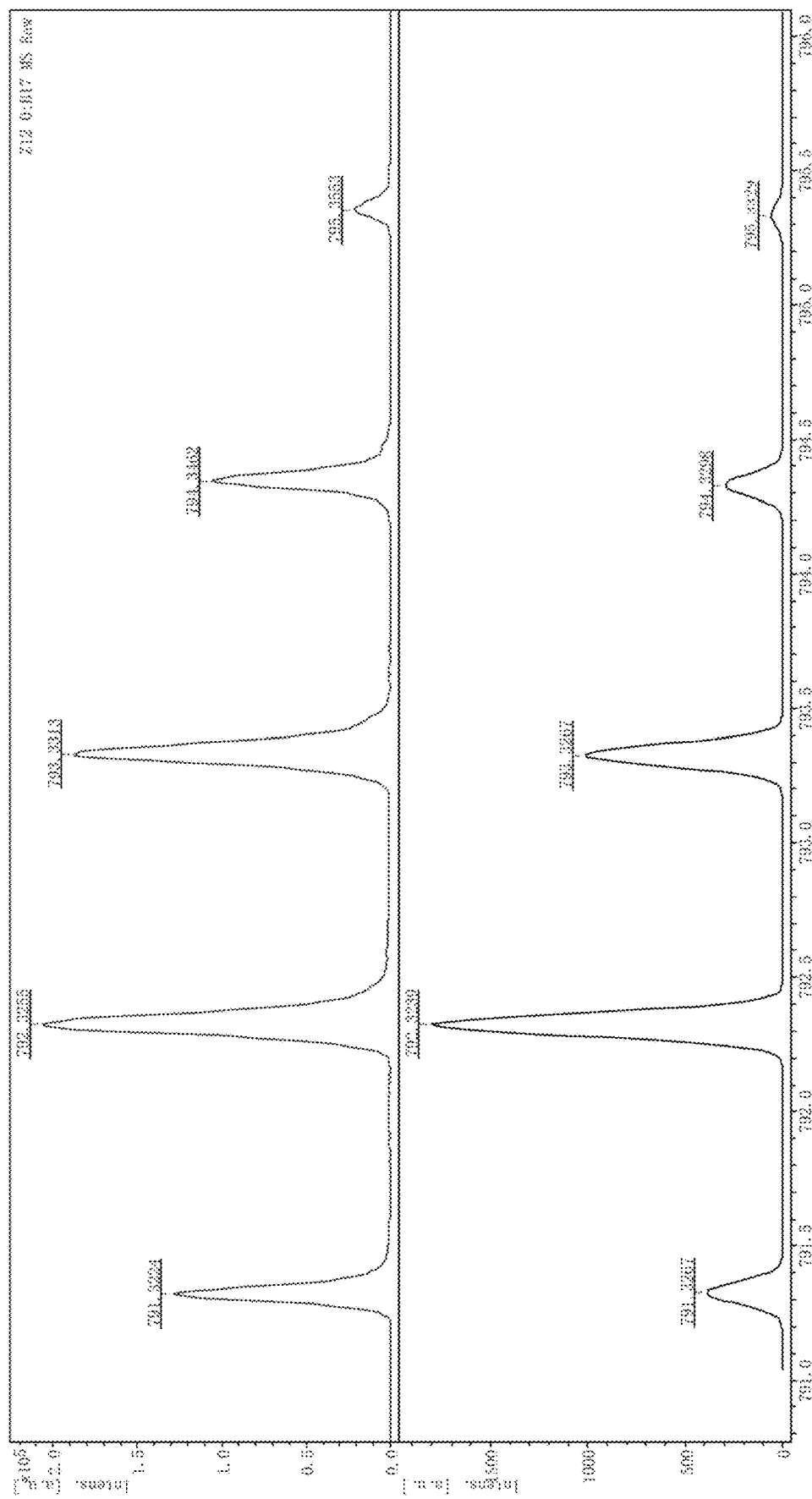
FIG. 3 is the high-resolution mass spectrum of the prepared BODIPY-2 according to some embodiments of the present disclosure.
Figure 4:
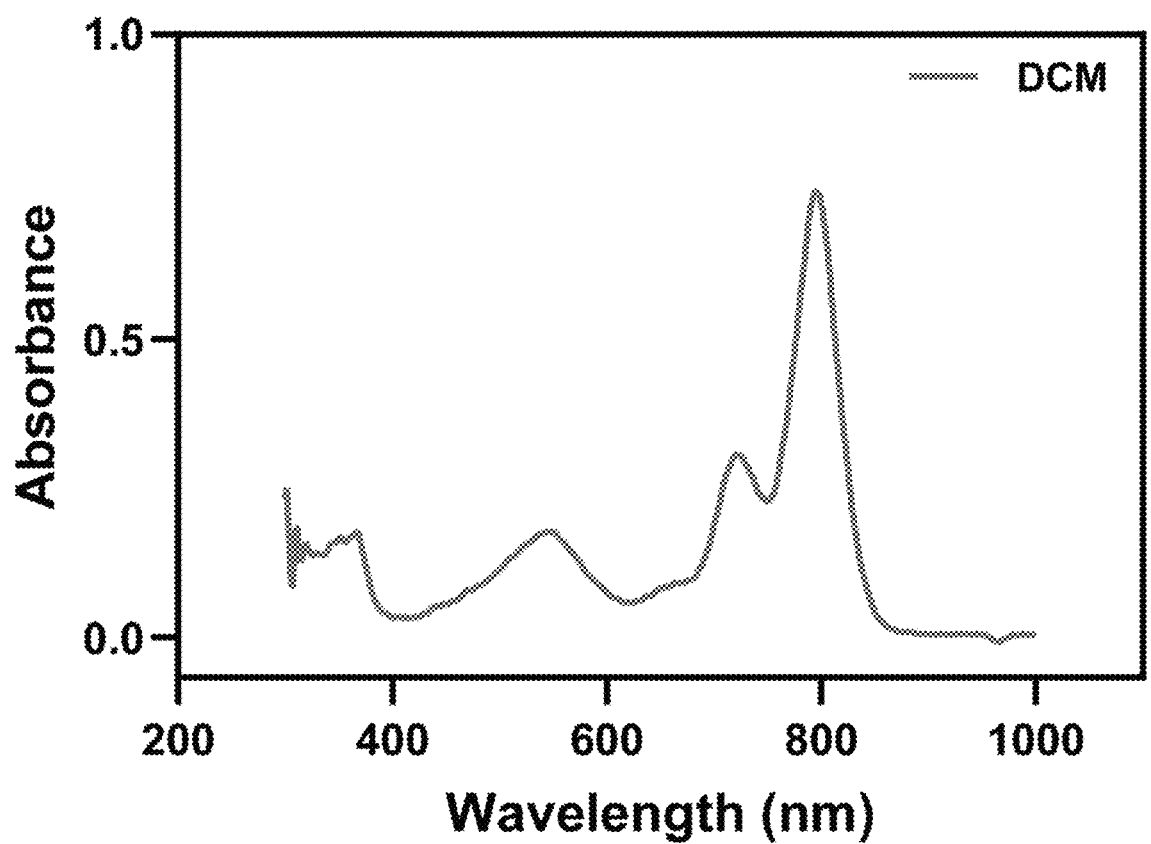
FIG. 4 is the absorption spectrum of the prepared BODIPY-2 according to some embodiments of the present disclosure.

The structure of the photocatalytic material BODIPY-2 prepared by one or more embodiments of the present disclosure is characterized by hydrogen nuclear magnetic resonance (as shown in FIG. 2), high-resolution mass spectrum (as shown in FIG. 3) and ultraviolet absorption spectrum (as shown in FIG. 4), whose characterization map data are as follows.

$^1$H NMR (600 MHz, CDCl$_3$): δ=8.09 (s, 2H), 7.35-7.28 (m, 6H), 7.28-7.21 (m, 4H), 7.18-7.11 (m, 8H), 7.11-7.07 (m, 2H), 6.97 (d, J=1.2 Hz, 2H), 6.85 (s, 2H), 6.71-6.70 (m, 2H), 6.27 (s, 2H), 2.27 (s, 3H), 2.12 (s, 6H) ppm.

HR-MS (MALDI-TOF) m/z: [M]$^+$ Calcd for C$_{54}$H$_{39}$BF$_2$N$_4$ 792.3236; Found 792.3255.

UV/Vis (CH$_2$Cl$_2$): λ$_{max}$ (ε[M$^{-1}$ cm$^{-1}$])=366 (33260), 541 (28540), 717 (57220), 794 (178160) nm.

Embodiment 6

The specific embodiment of photocatalytic reduction of hexavalent chromium using the BODIPY-2 prepared by one or more embodiments of the present disclosure with different amounts.

The prepared BODIPY-2 from the embodiment 1 with different amounts (5, 10, 20, 30, 40, 50 mg of the BODIPY-2) are weighed and the weighted BODIPY-2 is uniformly dispersed into five groups of potassium dichromate solutions (10 mg/L), respectively. After dark reaction for 30 min, the dark reaction reaches the equilibrium state. The reaction is carried out under the light of xenon lamp (500 W, λ>420 nm), and the sample is taken for color development after light reaction for 30 min, and then the absorbance test of hexavalent chromium (540 nm) is carried out and the data is collected.

Embodiment 7

The specific embodiment of photocatalytic reduction of hexavalent chromium with different concentrations using the BODIPY-2 prepared by one or more embodiments of the present disclosure:

The prepared BODIPY-2 from the embodiment 1 with 5 mg is weighted and the weighted BODIPY-2 is uniformly dispersed in (10, 20, 30, 40, 50, 60, 70, 80, 90, 100, 120, 140, 160, 180, 200 mg/L) of potassium dichromate solution. After dark reaction for 30 min, the dark reaction reaches the equilibrium state. The reaction is carried out under the light of xenon lamp (500 W, λ>420 nm), and the sample for color development is taken after light reaction for 30 min, and then the absorbance test of hexavalent chromium (540 nm) is carried out and the data is collected.

Embodiment 8

The specific embodiment of the photocatalytic reduction of hexavalent chromium under different acid-base environments using the prepared BODIPY-2 by one or more embodiments of the present disclosure.

5 mg of the prepared BODIPY-2 from the embodiment 1 is weighed and the weighed BODIPY-2 is uniformly dispersed in potassium dichromate solution (10 mg/L) (the pH of the reaction system is adjusted by 0.1 mol/L sulfuric acid solution or sodium hydroxide solution to 2, 4, 6, 8, respectively). After dark reaction for 30 min, the dark reaction reaches the equilibrium state, the reaction is carried out under the light of xenon lamp (500 W, λ>420 nm), and the sample is taken for color development after light reaction for 30 min, and then the absorbance test of hexavalent chromium (540 nm) is carried out and the data is collected.

Embodiment 9

The specific embodiment of reduction of hexavalent chromium under solar photocatalysis using the prepared BODIPY-2 by one or more embodiments of the present disclosure.

5 mg of BODIPY-2 from the embodiment 1 is weighed and the weighed BODIPY-2 is uniformly dispersing in potassium dichromate solution (10 mg/L). After dark reaction for 30 min, the dark reaction reaches the equilibrium state. The reaction is carried out under sunlight, and the sample is taken for color development after light reaction for 30 min, and then the absorbance test of hexavalent chromium (540 nm) is carried out and the data is collected.

According to the embodiments 6-9, the reduction rate analysis of photocatalytic hexavalent chromium is as follows.

Figure 5:
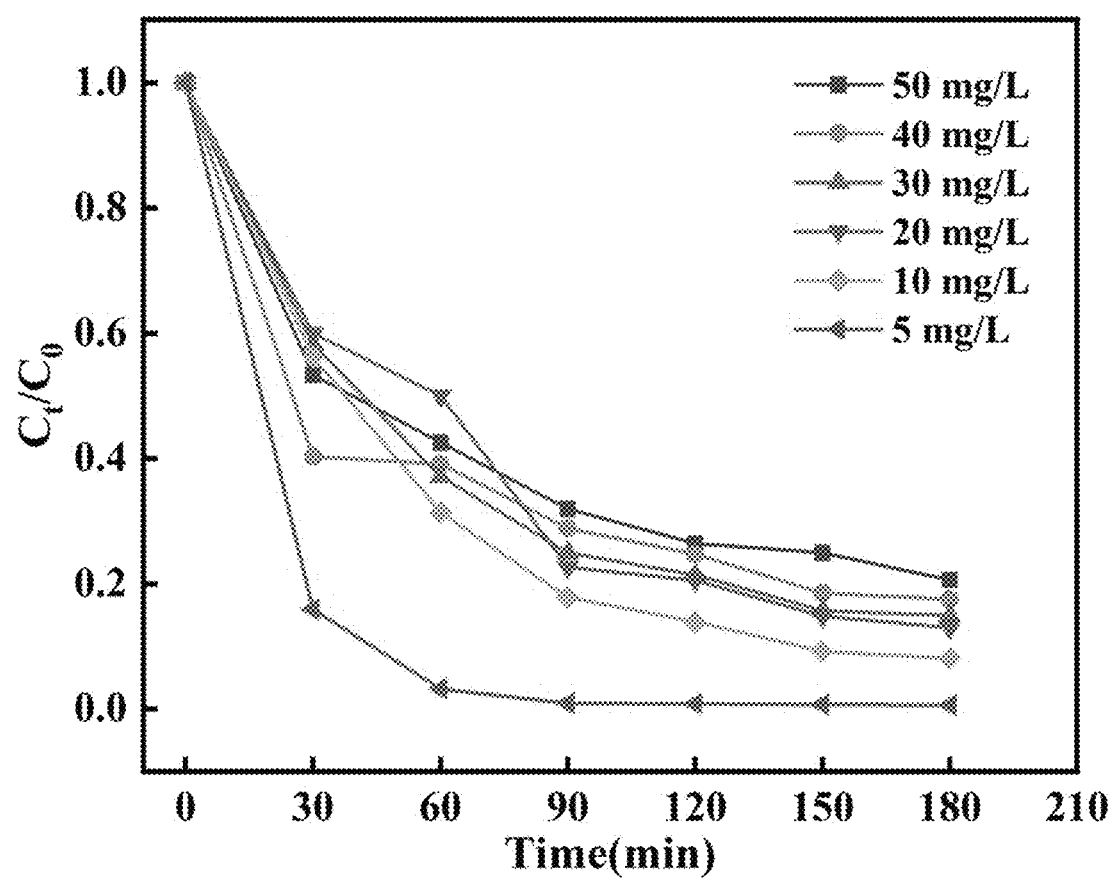
FIG. 5 is the relationship graph between the prepared BODIPY-2 with different dosages and the reduction rate of hexavalent chromium according to some embodiments of the present disclosure.

According to the data of embodiment 6, as shown in FIG. 5, the effect of BODIPY-2 with different amounts on the efficiency of photocatalytic reduction of hexavalent chromium is analyzed. Different amounts of BODIPY-2 are selected for photocatalytic hexavalent chromium reduction experiments on 10 mg/L of potassium dichromate solution, with the increasing BODIPY-2 sample amount, the reduction rate of hexavalent chromium shows a decreasing trend from 99.4% (5 mg of BODIPY-2 sample amount) to 79.4% (50 mg of BODIPY-2 sample amount). It can be seen that high concentration of sample amount hinders the light penetration effect and reduces the light utilization rate, which is not conducive to the reduction of hexavalent chromium. On the contrary, the low concentration of sample amount is beneficial to the reduction of hexavalent chromium.

Figure 6:
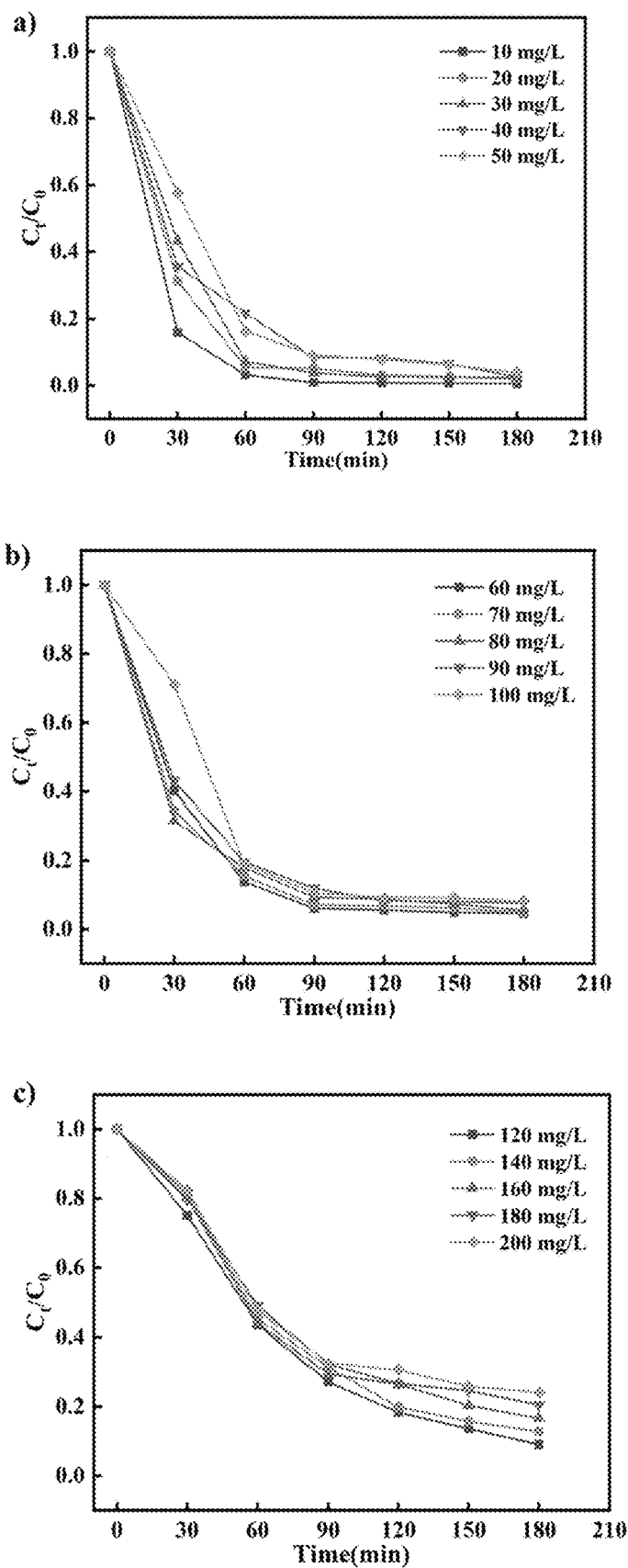
FIG. 6 is the relationship graph between the prepared BODIPY-2 and the reduction rate of hexavalent chromium with different concentrations according to some embodiments of the present disclosure.

According to the data of Embodiment 7, as shown in FIG. 6, the effect of BODIPY-2 on the efficiency of photocatalytic reduction of different concentrations of hexavalent chromium is analyzed. In the a) of FIG. 6, the concentration of hexavalent chromium is 10 mg/L-50 mg/L, in the b) of FIG. 6, the concentration of hexavalent chromium is 60 mg/L-100 mg/L, in the c) of FIG. 6, the concentration of hexavalent chromium is 120 mg/L-200 mg/L. A fixed amount of BODIPY-2 is selected for photocatalytic hexavalent chromium reduction experiments on different concentrations of potassium dichromate solution, with the increasing concentration of potassium dichromate solution, the reduction rate of hexavalent chromium shows a decreasing trend from 99.4% (the concentration of potassium dichromate solution is 10 mg/L) to 75.9% (the concentration of potassium dichromate solution is 200 mg/L). The maximum efficiency of photocatalytic reduction of hexavalent chromium is 0.017 mg/min and a maximum degradation amount of photocatalytic reduction of hexavalent chromium is 5 mg/3 mg.

Figure 7:
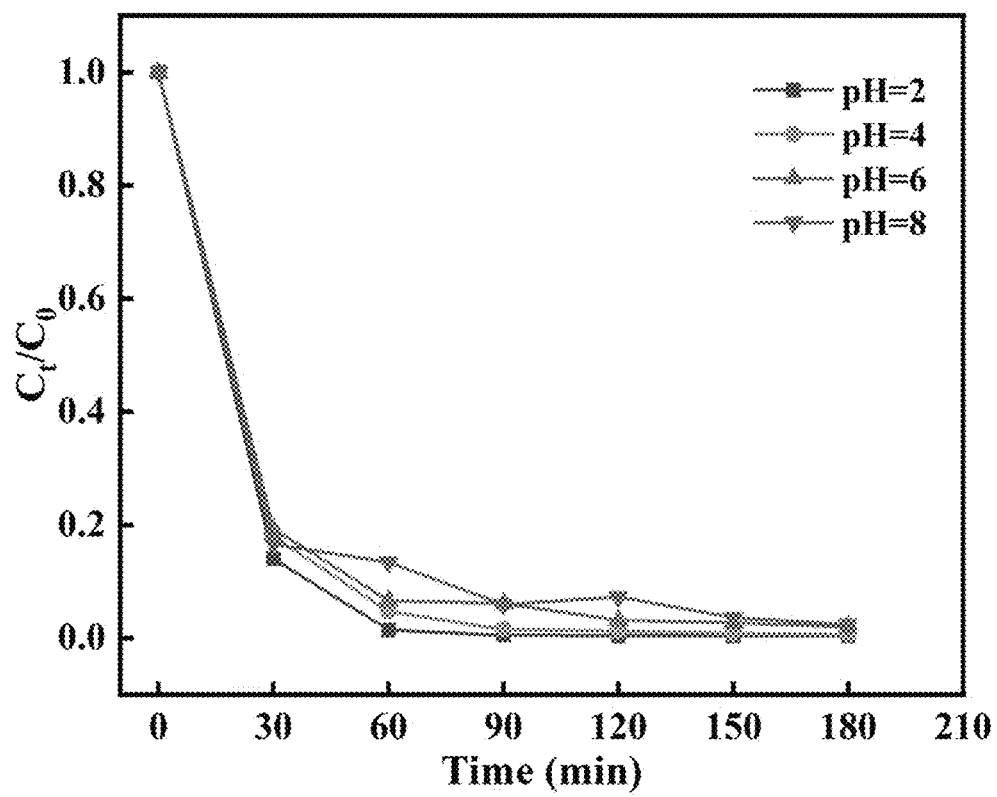
FIG. 7 is the relationship graph between the prepared BODIPY-2 and the reduction rate of hexavalent chromium at different pH according to some embodiments of the present disclosure.

According to the data of Embodiment 8, as shown in FIG. 7, the effect of BODIPY-2 on the efficiency of photocatalytic reduction of hexavalent chromium under different pH conditions is analyzed. Under different pH conditions, a fixed amount of BODIPY-2 is selected for the photocatalytic reduction of hexavalent chromium on a fixed concentration of potassium dichromate solution, and the lower the pH value is, the higher the efficiency of hexavalent chromium reduction is. When the aqueous solution is weakly alkaline, the reduction efficiency is as high as 97.6%, indicating that the photocatalytic material BODIPY-2 has good acid and alkaline resistance.

Figure 8:
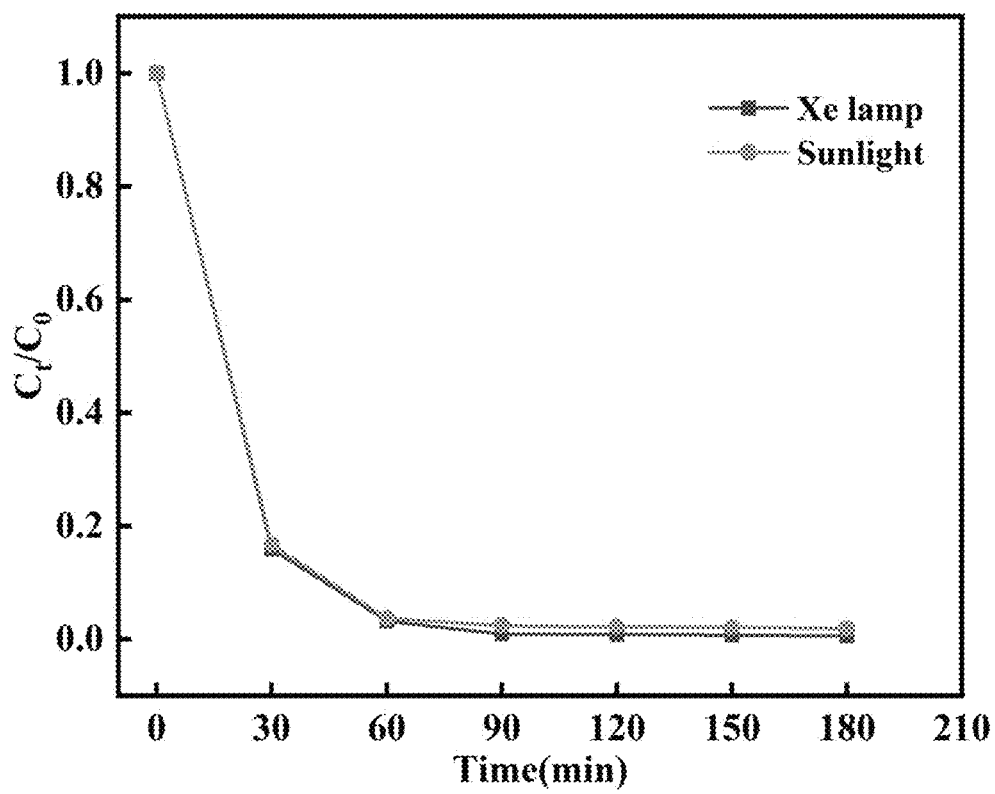
FIG. 8 is the relationship graph between the prepared BODIPY-2 and the reduction ratio of hexavalent chromium under different light sources according to some embodiments of the present disclosure.

According to the data of Embodiment 9, as shown in FIG. 8, the effect of BODIPY-2 on the efficiency of photocatalytic reduction of hexavalent chromium under different illumination is analyzed. A fixed amount of BODIPY-2 is selected for catalyzing the reduction of hexavalent chromium by different light sources on a fixed concentration of potassium dichromate solution, and the reduction rate of hexavalent chromium does not decrease significantly and reaches 98.1% by changing the light source from xenon lamp ((500 W, λ>420 nm) to sunlight, indicating that the photocatalytic material BODIPY-2 has good sunlight absorption ability and provides a method for how to use solar energy efficiently.

Although the above describes the specific implementation of one or more embodiments of the present disclosure, but the skilled person in the field should understand that these are only examples, a variety of changes or modifications are made to this implementation, without departing from the principle and substance of one or more embodiments of this specification, the scope of protection of one or more embodiments of the present disclosure is limited only by the appended claims.

What is claimed is:

1. A method for preparing a boron dipyrromethene (BODIPY) derivative, wherein the BODIPY derivative is BODIPY-2, and the method comprises:
    1) Taking BODIPY-1, diphenylacetylene, copper acetate monohydrate, anhydrous sodium carbonate, and metal catalyst, and dispersing the BODIPY-1, the diphenylacetylene, the copper acetate monohydrate, the anhydrous sodium carbonate, and the metal catalyst in an organic solvent for carrying out a cyclization reaction to obtain a cyclization product mixture, wherein a temperature of the cyclization reaction is in a range of 65° C.~75° C., a time of the cyclization reaction is in a range of 8 hours~15 hours, the metal catalyst is bis[(pentamethylcyclopentadienyl)dichloro-rhodium], and a molar ratio of the BODIPY-1 to the bis[(pentamethylcyclopentadienyl)dichloro-rhodium] is 1.0:(0.05~0.1);

2) Rotary evaporating the cyclization product mixture to obtain a concentrated solution of a reaction system; and 3) Purifying the concentrated solution of the reaction system by a column chromatography, continuing to rotary evaporate a purified product, and then drying a product after the rotary evaporating to obtain the BODIPY-2, wherein a mobile phase of the column chromatography for purification is formed by mixing dichloromethane and petroleum ether with a volume ratio of 1:1;

wherein structural formulas of the BODIPY-1 and the BODIPY-2 are as follows:

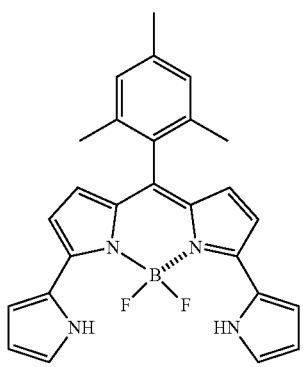

BODIPY-1

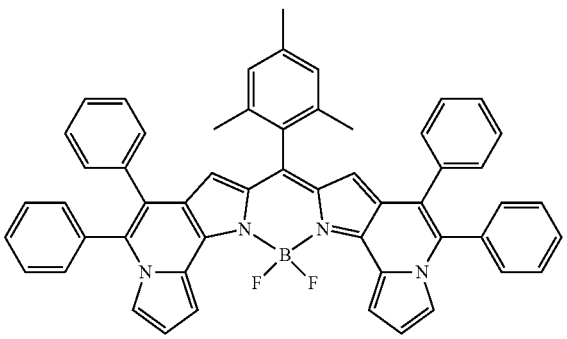

BODIPY-2

2. The method of claim 1, wherein in the operation 1), a molar ratio of the BODIPY-1 to the diphenylacetylene is 1.0:(2.3~3.0); a molar ratio of the BODIPY-1 to the copper acetate monohydrate is 1.0:(2.0~3.0); and a molar ratio of the BODIPY-1 to the anhydrous sodium carbonate is 1.0:(2.0~3.0).

3. The method of claim 1, wherein in the operation 1), the organic solvent is 1,2-dichloroethane, and a molar ratio of the BODIPY-1 and the 1,2-dichloroethane is 1.0:(250~500).

4. The method of claim 1, wherein in the operation 1), the cyclization reaction is carried out in an oil bath.

* * * * *